(12) United States Patent
Fei et al.

(10) Patent No.: US 11,874,555 B2
(45) Date of Patent: Jan. 16, 2024

(54) LIGHT SOURCE AND BACKLIGHT MODULE

(71) Applicant: TCL CHINA STAR OPTOELECTRONICS TECHNOLOGY CO., LTD., Guangdong (CN)

(72) Inventors: Yuhang Fei, Guangdong (CN); Hanyuan Liang, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/810,111

(22) Filed: Jun. 30, 2022

(65) Prior Publication Data
US 2023/0408865 A1  Dec. 21, 2023

(30) Foreign Application Priority Data

Jun. 15, 2022 (CN) .......................... 202210682064.9

(51) Int. Cl.
*G02F 1/1335*  (2006.01)
*G02F 1/13357* (2006.01)
*F21V 7/00*  (2006.01)
*F21K 9/68*  (2016.01)

(52) U.S. Cl.
CPC .......... *G02F 1/133607* (2021.01); *F21K 9/68* (2016.08); *G02F 1/133603* (2013.01); *G02F 1/133605* (2013.01)

(58) Field of Classification Search
CPC ............... H01L 33/60; G02F 1/133607; G02F 1/133603; G02F 1/133605; F21V 5/005; F21V 5/045; F21V 5/04; F21V 17/02; F21V 14/04; F21V 14/06; F21V 5/048; F21V 7/0091; F21K 9/65; F21K 9/68; F21K 9/69; G02B 6/0021; G02B 6/0055
See application file for complete search history.

(56) References Cited

U.S. PATENT DOCUMENTS

| | | | |
|---|---|---|---|
| 7,736,044 B2* | 6/2010 | Chew | F21V 29/503 362/249.02 |
| 8,814,378 B2* | 8/2014 | Tang | G09F 13/04 362/249.02 |
| 11,287,106 B1* | 3/2022 | Pan | F21V 5/007 |
| 2008/0049449 A1* | 2/2008 | Liu | G02B 6/0021 362/23.11 |

(Continued)

*Primary Examiner* — Erin Kryukova

(57) ABSTRACT

A light source and a backlight module are provided. The light source includes a lens and a light bead arranged in an accommodating cavity of the lens. The lens includes a light incident surface, a reflecting surface, and a light emitting surface. Light emitted by the light bead is directed to a preset direction through the lens through adjusting a reflection direction of the reflecting surface. The reflecting surface includes a first reflecting surface and a second reflecting surface, the first reflecting surface and the second reflecting surface are connected at a turning angle, and the turning angle is greater than 0 degrees and less than 180 degrees. The angle of the turning angle between the first reflecting surface and the second reflecting surface can be adjusted to adjust reflection directions of the first reflecting surface and the second reflecting surface.

13 Claims, 2 Drawing Sheets

(56) References Cited

U.S. PATENT DOCUMENTS

2009/0310356 A1* 12/2009 Laporte ................ F21V 7/0091
362/239
2015/0369451 A1* 12/2015 Hwang .................. F21V 5/048
362/97.1

* cited by examiner

LIGHT SOURCE AND BACKLIGHT MODULE

CROSS-REFERENCE TO RELATED PATENT APPLICATION

This application claims priority to Chinese patent application No. 202210682064.9, titled "LIGHT SOURCE AND BACKLIGHT MODULE" and filed on Jun. 15, 2022 with the China National Intellectual Property Administration, which is incorporated by reference in the present application in its entirely.

FIELD OF DISCLOSURE

The present disclosure relates to the field of display panel technology, and more particularly, to a light source and a backlight module of a touch display panel.

BACKGROUND OF DISCLOSURE

From a cathode ray tube (CRT) era to a liquid crystal era, and now to an organic light emitting diode (OLED) era, the display industry has experienced decades of development. With developments of the technology, all kinds of display products are presented for visual enjoyment of people. The display industry has been closely related to our lives. From conventional mobile phones, tablets, TVs, and PCs to current electronic devices such as smart wearable devices, VR, and in-vehicle displays, the display technology is inseparable.

In recent years, with rise of intelligent elements, human-computer interaction has become more and more frequent, and multi-usage in a single large screen is more and more important, e.g., an in-vehicle super-large display panel is required to be satisfied with different viewing angles from different positions in particle regions, or a super-large strip-shaped display panel is required to be satisfied with different viewing angles from different positions. In the related art, a requirement of different viewing angles is achieved by a manner of adjusting a polarizer, but this solution is highly customized, and a designable space of a module is relatively small. Therefore, currently, it is a problem to-be-solved for the requirements of the viewing angles of large-sized display devices at different positions.

Therefore, it is necessary to develop a new type of light source to solve a problem of the different viewing angles of the large-sized display devices at different positions in the prior art.

SUMMARY OF INVENTION

The present invention provides a light source and a backlight module for solving a problem of viewing angle requirements being different for a conventional large-sized display device at different positions.

In order to solve the above-mentioned technical problems, embodiments of the present invention provide technical solutions as follows:

In one aspect, a light source is provided. The light source includes a lens and a light bead arranged in an accommodating cavity of the lens; wherein the lens includes a light incident surface, a reflecting surface, and a light emitting surface, a reflection direction of the reflecting surface is adjustable, and light emitted by the light bead is directed to a preset direction through the lens through adjusting the reflection direction of the reflecting surface.

In addition to one or more technical features as provided above, or as a replacement, the light incident surface includes a first light incident surface, a second light incident surface, a third light incident surface, and a fourth light incident surface, the first light incident surface, the second light incident surface, the third light incident surface, and the fourth light incident surface form the accommodating cavity, and a gap is defined between the light bead and the light incident surface.

In addition to one or more technical features as provided above, or as a replacement, the reflecting surface includes a first reflecting surface and a second reflecting surface, the first reflecting surface is connected to the second reflecting surface and are connected at a turning angle, and the turning angle is greater than 0 degrees and less than 180 degrees.

In addition to one or more technical features as provided above, or as a replacement, the light emitting surface includes a first light emitting surface and a second light emitting surface, the first light emitting surface is connected to the first reflecting surface, and a plane where the first light emitting surface is located is perpendicular to a plane where the first reflecting surface is located; the first light emitting surface is connected to the second reflecting surface, and the plane where the first light emitting surface is located is perpendicular to a plane where the second reflecting surface is located; the second light emitting surface is connected to the first reflecting surface, and a plane where the second light emitting surface is located is perpendicular to the plane where the first reflecting surface is located; and the second light emitting surface is connected to the second reflecting surface, and the plane where the second light emitting surface is located is perpendicular to a plane where the second reflecting surface is located.

In addition to one or more technical features as provided above, or as a replacement, the lens is a plane lens, the plane where the first light emitting surface is located is parallel to the plane where the first light incident surface is located, the plane where the second light emitting surface is located is parallel to the plane where the second light incident surface is located, the plane where the first reflecting surface is located is parallel to a plane where the third light incident surface is located, and the plane where the second reflecting surface is located is parallel to a plane where the fourth light incident surface is located.

In addition to one or more technical features as provided above, or as a replacement, an angle of the turning angle between the first reflecting surface and the second reflecting surface is adjustable, and a reflection direction of the first reflecting surface and a reflection direction of the second reflecting surface are further adjusted through adjusting the angle of the turning angle between the first reflecting surface and the second reflecting surface.

In addition to one or more technical features as provided above, or as a replacement, a reflectivity of the first reflecting surface ranges from 0 to 1, and a reflectivity of the second reflecting surface ranges from 0 to 1.

In addition to one or more technical features as provided above, or as a replacement, a light emitting diode is adopted as the light bead, and the light emitted by the light bead is emitted toward the lens.

In addition to one or more technical features as provided above, or as a replacement, a material of the lens can be one of materials such as PMMA, PC, PS, silicone, glass, etc., or can be other materials with a same or similar properties.

In another aspect, a backlight module is provided. The backlight module includes: a back panel; and a plurality of the light sources involved in the present invention arranged in an array on the back panel.

In addition to one or more technical features as provided above, or as a replacement, the backlight module includes a first region and a second region, an intensity of light emitted by the light source in the first region and an intensity of light emitted by the light source in the second region are different, and a direction of the light emitted by the light source in the first region is different from a direction of the light emitted by the light source in the second region.

In addition to one or more technical features as provided above, or as a replacement, the angle of the turning angle between the first reflecting surface and the second reflecting surface of the lens in the first region is greater than the angle of the turning angle between the first reflecting surface and the second reflecting surface of the lens in the second region, so that a viewing angle of the first region is larger than a viewing angle of the second region.

In addition to one or more technical features as provided above, or as a replacement, a reflectivity of the first reflecting surface and a reflectivity of the second reflecting surface in the first region is greater than a reflectivity of the first reflecting surface and a reflectivity of the second reflecting surface in the second region, so that a light intensity of the first region is greater than a light intensity of the second region.

In addition to one or more technical features as provided above, or as a replacement, light beads are connected to the back panel through a manner of gluing.

One of the above technical solutions has the following advantages or beneficial effects: through adjusting the angle of the turning angle between the first reflecting surface and the second reflecting surface and the reflectivity of the first reflecting surface and the reflectivity of the second reflecting surface, the viewing angle and the light intensity required for different scenarios can be satisfied.

BRIEF DESCRIPTION OF DRAWINGS

The following describes specific embodiments of the present invention in detail with reference to the accompanying drawings, which will make technical solutions and other beneficial effects of the present invention obvious.

Figure 1:
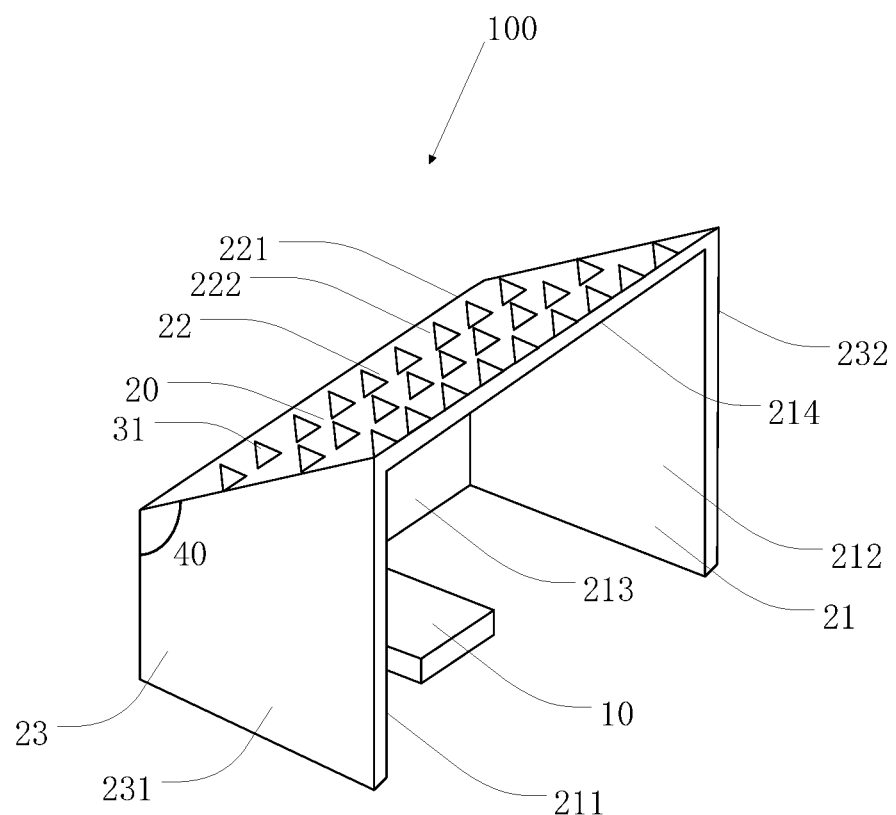
FIG. 1 is a structural schematic view of a light source provided by an embodiment of the present invention.

REFERENCE NUMERAL light source 100; light bead 10;
lens 20; light incident surface 21;
first light incident surface 211; second light incident surface 212;
third light incident surface 213; fourth light incident surface 214;
first reflecting surface 221; second reflecting surface 222;
first light emitting surface 231; second light emitting surface 232;
back panel 200; backlight module 1;
first region 101; second region 102;
microstructure 31.

DETAILED DESCRIPTION OF PRESENT EMBODIMENTS

The technical solution of the present invention embodiment will be clarified and completely described with reference accompanying drawings in embodiments of the present invention embodiment. In the description of the present invention, it should be explained that the terms "center", "portrait", "transverse", "length", "width", "thickness", "upper", "lower", "front", the directions or positional relationships indicated by "back", "left", "right", "vertical", "horizontal", "top", "bottom", "inside", "outside", etc. are based on the drawings. The orientation or positional relationship is only for the convenience of describing the present invention and simplifying the description, and does not indicate or imply that the device or element referred to must have a specific orientation, or a structure or an operation in a specific orientation, and should not be viewed as limitations of the present invention.

Figure 2:
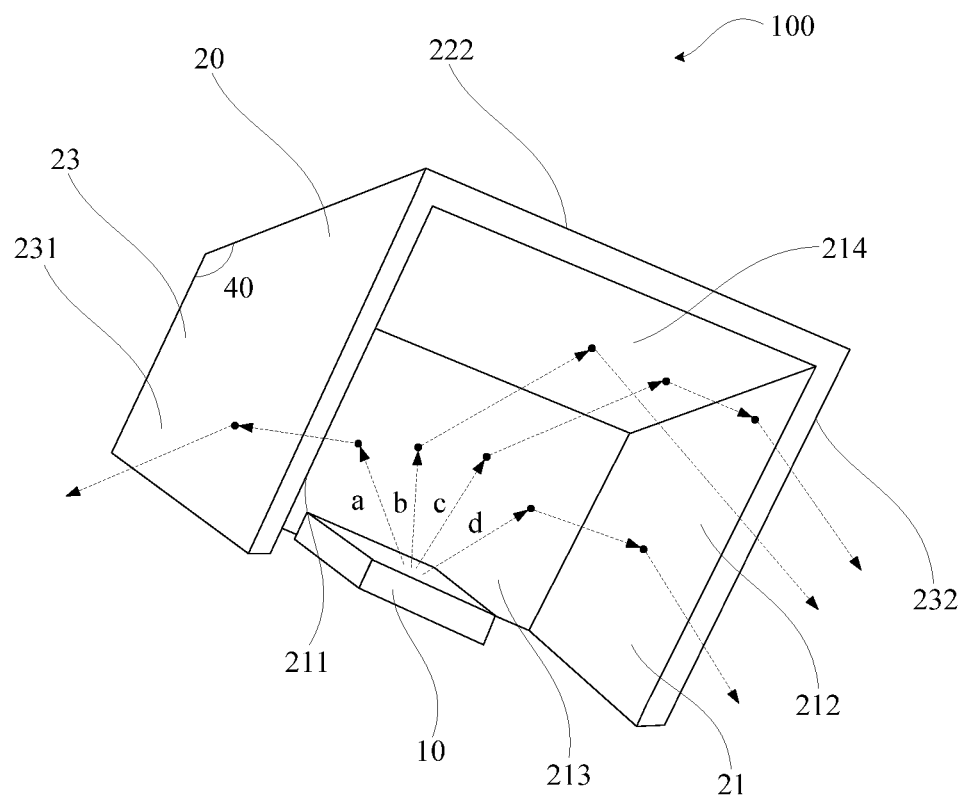
FIG. 2 is a structural schematic view of another light source provided by an embodiment of the present invention.

Referring to FIGS. 1-2. FIG. 1 and FIG. 2 are structural schematic views of a light source 100 provided by embodiments of the present invention. The light source 100 includes a light bead 10 and a lens 20.

In this embodiment, a light emitting diode is adopted as the light bead 10, and light emitted by the light bead 10 is emitted toward the lens 20.

The lens 20 includes a light incident surface 21, a reflecting surface 22, and a light emitting surface 23, and the lens 20 is a plane lens 20, so that the light incident surface 21, the reflecting surface 22, and the light emitting surface 23 are all planar. A material of the lens 20 can be one of materials such as PMMA, PC, PS, silicone, glass, etc., or can be other materials with a same or similar properties.

The light incident surface 21 includes a first light incident surface 211, a second light incident surface 212, a third light incident surface 213, and a fourth light incident surface 214 that are connected. The first light incident surface 211 is connected to the second light incident surface 212 through the third light incident surface 213 and the fourth light incident surface 214, the first light incident surface 211, the second light incident surface 212, the third light incident surface 213, and the fourth light incident surface 214 are connected to form an accommodating cavity, the light bead 10 is located in the accommodating cavity of the lens 20, and a gap is defined between the light bead and each of the first light incident surface 211, the second light incident surface 212, the third light incident surface 213, and the fourth light incident surface 214. Since the lens 20 is the plane lens 20, the first light incident surface 211, the second light incident surface 212, the third light incident surface 213, and the fourth light incident surface 214 are all planar.

A plane where the first light incident surface 211 is located is parallel to a plane where the second light incident surface 212 is located, the plane where the first light incident surface 211 is located is perpendicular to a plane where the third light incident surface 213 is located, and the plane where the third light incident surface 213 is located is perpendicular to a plane where the fourth light incident surface 214 is located. The third light incident surface 213 is connected to the fourth light incident surface 214 and are connected at an included angle, and an angle of the included angle is greater than 0 degrees and less than 180 degrees. In this embodiment, the included angle between the third light incident surface 213 and the fourth light incident surface 214 is 145 degrees.

The reflecting surface 22 includes a first reflecting surface 221 and a second reflecting surface 222. The first reflecting surface 221 and the second reflecting surface 222 are connected at a turning angle 40, the turning angle 40 is greater than 0 degrees and less than 180 degrees. An angle of the turning angle 40 is same as the angle of the included angle. A reflectivity of the first reflecting surface 221 ranges from 0 to 1, and a reflectivity of the second reflecting surface 222 ranges from 0 to 1.

In this embodiment, a reflectivity of the first reflecting surface 221 and a reflectivity of the second reflecting surface 222 are both 0.8, the reflectivity of the first reflecting surface 221 and the reflectivity of the second reflecting surface 222 can be adjusted. The greater the reflectivity of the first reflecting surface 221 and the reflectivity of the second reflecting surface 222, the higher an intensity of the light emitted by the light bead 10 through the lens 20. The lower the reflectivity of the first reflecting surface 221 and the reflectivity of the second reflecting surface 222, the lower the intensity of the light emitted by the light bead 10 through the lens 20. By adjusting the reflectivity of the first reflecting surface 221 and the reflectivity of the second reflecting surface 222, the light emitted by the light bead 10 emitted through the lens 20 can reach a preset light intensity.

Microstructures 31 are provided on the second reflecting surface 222, and a shape of the microstructures 31 is a pyramid. In other embodiments, the shape of the microstructures 31 can also be three-dimensional microstructures such as hemispherical, semi-ellipsoidal, etc., and a light emitting uniformity of the interface between the first reflecting surface 221 and the second reflecting surface 222 can also be enhanced through roughness treatments such as surface embossment or frosting. The microstructures 31 provided on the interface between the first reflecting surface 221 and the second reflecting surface 222 enable incident light emitted from different parts of the light source 100 to be uniformly emitted from the lens 20.

In other embodiments, diffusing particles can also be disposed on the interface between the first reflecting surface 221 and the second reflecting surface 222, so as to achieve local light fine-tuning.

The light emitting surface 23 includes a first light emitting surface 231 and a second light emitting surface 232, and a plane where the first light emitting surface 231 is located is parallel to a plane where the second light emitting surface 232 is located. The first light emitting surface 231 is connected to the first reflecting surface 221, and the plane where the first light emitting surface 231 is located is perpendicular to a plane where the first reflecting surface 221 is located. The first light emitting surface 231 is connected to the second reflecting surface 222, and the plane where the first light emitting surface 231 is located is perpendicular to a plane where the second reflecting surface 222 is located. The second light emitting surface 232 is connected to the first reflecting surface 221, and the plane where the second light emitting surface 232 is located is perpendicular to the plane where the first reflecting surface 221 is located. The second light emitting surface 232 is connected to the second reflecting surface 222, and the plane where the second light emitting surface 232 is located is perpendicular to the plane where the second reflecting surface 222 is located.

Since the lens 20 is the plane lens 20, the plane where the first light emitting surface 231 is located is parallel to the plane where the first light incident surface 211 is located, the plane where the second light emitting surface 232 is located is parallel to the plane where the second light incident surface 212 is located, the plane where the reflecting surface 221 is located is parallel to the plane where the third light incident surface 213 is located, and the plane where the second reflecting surface 222 is located is parallel to the plane where the fourth light incident surface 214 is located.

As shown in FIG. 2, a, b, c, and d illustrate optical paths of the light emitted by the light bead through the lens 20. In this embodiment, a direction of the light emitted by the light bead through the lens 20 can be adjusted, and the angle of the turning angle 40 between the first reflecting surface 221 and the second reflecting surface 222 of the lens 20 can be adjusted. Specifically, through adjusting the angle of the turning angle 40 between the first reflecting surface 221 and the second reflecting surface 222, a reflection direction of the first reflecting surface 221 and a reflection direction of the second reflecting surface 222 are adjusted, so that the light emitted by the light bead 10 is directed to a preset direction through the lens 20.

In this embodiment, the intensity of the light emitted by the light bead through the lens 20 can also be adjusted, and an intensity of the light reflected by the reflecting surface 22 of the lens 20 can be adjusted. Specifically, the reflectivity of the first reflecting surface 221 and the reflectivity of the second reflecting surface 222 can be adjusted. Through adjusting the reflectivity of the first reflecting surface 221 and the reflectivity of the second reflecting surface 222, the light emitted by the light bead 10 emitted through the lens 20 can reach the preset light intensity.

Figure 3:
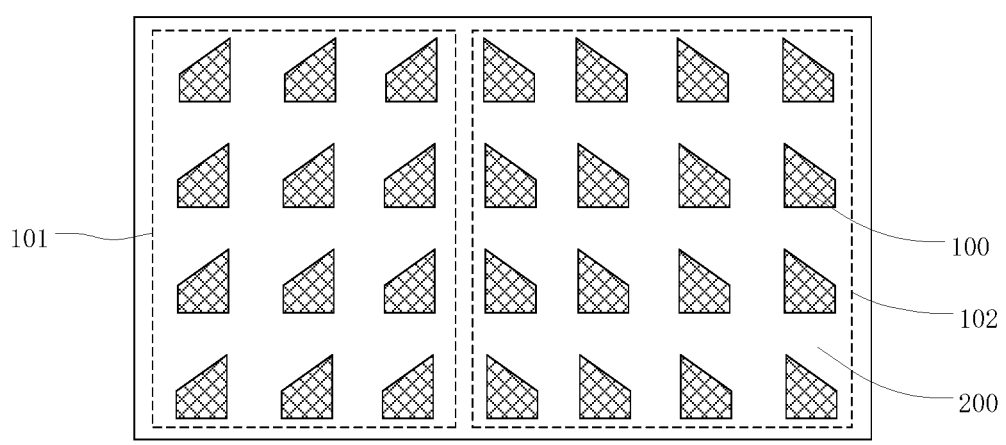
FIG. 3 is a structural schematic view of a backlight module provided by an embodiment of the present invention.

This embodiment further provides a backlight module 1. Referring to FIG. 1, FIG. 2, and FIG. 3, FIG. 3 is a structural schematic view of a backlight module 1 provided by an embodiment of the present invention. The backlight module 1 includes a back panel 200 and a plurality of light sources 100 involved in this embodiment. The light sources 100 can be a direct back-lit light source 100, and the plurality of light sources 100 are arranged on the back panel 200 in an array. Light beads 10 are connected to the back panel 200 through a manner of gluing.

The backlight module 1 includes a first region 101 and a second region 102. An intensity of the light emitted by the light source 100 in the first region 101 is different from an intensity of the light emitted by the light source 100 in the second region 102, and a direction of the light emitted by the light source 100 in the first region 101 is different from a direction of the light emitted by the light source 100 in the second region 102.

Specifically, the angle of the turning angle between the first reflecting surface 221 and the second reflecting surface 222 of the lens 20 in the first region 101 is greater than the angle of the turning angle between the first reflecting surface 221 and the second reflecting surface 222 of the lens 20 in the second region 102, so that a viewing angle of the first region 101 is larger than a viewing angle of the second region 102.

The reflectivity of the first reflecting surface 221 and the reflectivity of the second reflecting surface 222 in the first region 101 is greater than the reflectivity of the first reflecting surface 221 and the reflectivity of the second reflecting surface 222 in the second region 102, so that a light intensity of the first region 101 is greater than a light intensity of the second region 102.

Through adjusting the angle of the turning angle between the first reflecting surface 221 and the second reflecting surface 222 and the reflectivity of the first reflecting surface 221 and the second reflecting surface 222, the viewing angle and the light intensity required for different scenarios can be satisfied.

When the backlight module 1 is applied to a display panel, since light in four corner regions of a conventional display panel is relatively weak, dark shadows are obvious in the four corner regions. In addition, viewing angles of corner regions are relatively small, so that the corner region requires larger viewing angles and stronger light intensity, so that the angle of the turning angle between the first reflecting surface 221 and the second reflecting surface 222 of the lens 20 in the four corner regions of the display panel are increased, and the reflectivity of the first reflecting surface 221 and the second reflecting surface 222 in the four corner regions are increased, so that requirements for different viewing angles of a same screen are satisfied, thereby achieving viewing angle optimization, split-screen display, and controllable viewing angles.

This embodiment further provides a display panel including the backlight module 1 involved in this embodiment, an optical film, and a liquid crystal display film layer. The optical film includes a diffusion plate and a prism plate.

Through adjusting the angle of the turning angle between the first reflecting surface 221 and the second reflecting surface 222 and the reflectivity of the first reflecting surface 221 and the reflectivity of the second reflecting surface 222, the viewing angle and the light intensity required for different scenarios are satisfied, and the viewing angles optimization, the split-screen display, and the controllable viewing angles are achieved.

The light source and the backlight module provided by embodiments of the present invention are described in detail above, and the description of embodiments above is only for helping to understand technical solutions of the present invention and its core idea. It should be understood that for a person of ordinary skill in the art can make various modifications of the technical solutions of the embodiments of the present invention above. However, it does not depart from the scope of the technical solutions of the embodiments of the present invention.

What is claimed is:

1. A light source comprising:
   a lens and a light bead arranged in an accommodating cavity of the lens;
   wherein the lens comprises a light incident surface, a reflecting surface, and a light emitting surface; and
   wherein the light incident surface comprises a first light incident surface, a second light incident surface, a third light incident surface, and a fourth light incident surface, the first light incident surface, the second light incident surface, the third light incident surface, and the fourth light incident surface form the accommodating cavity, and a gap is defined between the light bead and the light incident surface; and
   wherein the reflecting surface comprises a first reflecting surface and a second reflecting surface, the first reflecting surface is connected to the second reflecting surface, a turning angle is defined between the first reflecting surface and the second reflecting surface, and an angle of the turning angle is greater than 0 degrees and less than 180 degrees; and
   wherein the light emitting surface comprises a first light emitting surface and a second light emitting surface, the first light emitting surface is connected to the first reflecting surface, and a plane where the first light emitting surface is located is perpendicular to a plane where the first reflecting surface is located; the first light emitting surface is connected to the second reflecting surface, and the plane where the first light emitting surface is located is perpendicular to a plane where the second reflecting surface is located; the second light emitting surface is connected to the first reflecting surface, and a plane where the second light emitting surface is located is perpendicular to the plane where the first reflecting surface is located; and the second light emitting surface is connected to the second reflecting surface, and the plane where the second light emitting surface is located is perpendicular to a plane where the second reflecting surface is located.

2. The light source according to claim 1, wherein the plane where the first light emitting surface is located is parallel to the plane where the first light incident surface is located, the plane where the second light emitting surface is located is parallel to the plane where the second light incident surface is located, the plane where the first reflecting surface is located is parallel to a plane where the third light incident surface is located, and the plane where the second reflecting surface is located is parallel to a plane where the fourth light incident surface is located.

3. The light source according to claim 1, wherein a reflectivity of the first reflecting surface ranges from 0 to 1, and a reflectivity of the second reflecting surface ranges from 0 to 1.

4. The light source according to claim 1, wherein microstructures are provided on the second reflecting surface.

5. The light source according to claim 1, wherein the light bead is a light emitting diode, and the light emitted by the light bead is emitted toward the lens.

6. The light source according to claim 1, wherein a material of the lens is at least one of PMMA, PC, PS, silicone, and glass.

7. A backlight module comprising:
   a back panel; and
   a plurality of light sources arranged in an array on the back panel, wherein each of the light sources comprises a lens and a light bead arranged in an accommodating cavity of the lens, the lens comprises a light incident surface, a reflecting surface, and a light emitting surface;
   wherein the light incident surface comprises a first light incident surface, a second light incident surface, a third light incident surface, and a fourth light incident surface, the first light incident surface, the second light incident surface, the third light incident surface, and the fourth light incident surface form the accommodating cavity, and a gap is defined between the light bead and the light incident surface;
   wherein the reflecting surface comprises a first reflecting surface and a second reflecting surface, the first reflecting surface is connected to the second reflecting surface, a turning angle is defined between the first reflecting surface and the second reflecting surface, and an angle of the turning angle is greater than 0 degrees and less than 180 degrees; and
   the light emitting surface comprises a first light emitting surface and a second light emitting surface, the first light emitting surface is connected to the first reflecting surface, and a plane where the first light emitting surface is located is perpendicular to a plane where the first reflecting surface is located; the first light emitting surface is connected to the second reflecting surface, and the plane where the first light emitting surface is located is perpendicular to a plane where the second reflecting surface is located; the second light emitting surface is connected to the first reflecting surface, and a plane where the second light emitting surface is located is perpendicular to the plane where the first reflecting surface is located; and the second light emitting surface is connected to the second reflecting surface, and the plane where the second light emitting surface is located is perpendicular to a plane where the second reflecting surface is located.

8. The backlight module according to claim 7, wherein the backlight module comprises a first region and a second region, the first region comprises at least one of the light sources, the second region comprises at least one of the light sources, an intensity of light emitted by the at least one of the light sources in the first region is greater than an intensity of light emitted by the at least one of the light sources in the second region.

9. The backlight module according to claim 8, wherein a reflectivity of the first reflecting surface of each lens of the at least one of the light sources in the first region is greater than a reflectivity of the first reflecting surface of each lens of the at least one of the light sources in the second region, and a reflectivity of the second reflecting surface of each lens of the at least one of the light sources in the first region is greater than a reflectivity of the second reflecting surface of each lens of the at least one of the light sources in the second region.

10. The backlight module according to claim 7, wherein the plane where the first light emitting surface is located is parallel to the plane where the first light incident surface is located, the plane where the second light emitting surface is located is parallel to the plane where the second light incident surface is located, the plane where the first reflecting surface is located is parallel to a plane where the third light incident surface is located, and the plane where the second reflecting surface is located is parallel to a plane where the fourth light incident surface is located.

11. The backlight module according to claim 7, wherein a reflectivity of the first reflecting surface ranges from 0 to 1, and a reflectivity of the second reflecting surface ranges from 0 to 1.

12. The backlight module according to claim 7, wherein microstructures are provided on the second reflecting surface.

13. The backlight module according to claim 7, wherein the light bead is a light emitting diode, and the light emitted by the light bead is emitted toward the lens.

* * * * *